United States Patent
Locher et al.

(10) Patent No.: US 12,365,003 B2
(45) Date of Patent: Jul. 22, 2025

(54) APPLICATION DEVICE AND CORRESPONDING APPLICATION METHOD

(71) Applicant: Dürr Systems AG, Bietigheim-Bissingen (DE)

(72) Inventors: Bernd Locher, Knittlingen (DE); Sebastian Gries, Heilbronn (DE)

(*) Notice: Subject to any disclaimer, the term of this patent is extended or adjusted under 35 U.S.C. 154(b) by 0 days.

(21) Appl. No.: 18/480,040

(22) Filed: Oct. 3, 2023

(65) Prior Publication Data
US 2024/0024910 A1  Jan. 25, 2024

Related U.S. Application Data

(63) Continuation of application No. 17/601,974, filed as application No. PCT/EP2020/059197 on Apr. 1, 2020, now Pat. No. 11,779,952.

(30) Foreign Application Priority Data

Apr. 8, 2019  (DE) .................. 10 2019 109 208.6

(51) Int. Cl.
*B05C 5/02* (2006.01)
*B05C 11/10* (2006.01)
(Continued)

(52) U.S. Cl.
CPC ........ *B05C 5/0212* (2013.01); *B05C 11/1013* (2013.01); *B05C 11/1036* (2013.01);
(Continued)

(58) Field of Classification Search
None
See application file for complete search history.

(56) References Cited

U.S. PATENT DOCUMENTS

| 4,530,862 A | * | 7/1985 | Kerzel | .................. B05C 11/10 427/288 |
| 4,667,852 A | | 5/1987 | Siemann | |

(Continued)

FOREIGN PATENT DOCUMENTS

| CN | 1207963 A | 2/1999 |
| CN | 101815687 A | 8/2010 |

(Continued)

OTHER PUBLICATIONS

China Intellectual Property Office Administration Office Action for related Application No. CN202080027436.3 mailed Oct. 18, 2022 (26 Pages; with English machine translation).

(Continued)

*Primary Examiner* — Jethro M. Pence
(74) *Attorney, Agent, or Firm* — Taft Stettinius & Hollister LLP; Thomas E. Bejin; John W. Carpenter

(57) ABSTRACT

The disclosure relates to an application device for applying an application agent (e.g. heat-conducting paste) into a cavity, in particular in a battery module of an electric battery. The application device according to the disclosure comprises a nozzle for dispensing the application agent through the nozzle and a first pressure sensor for measuring a first pressure reading ($p_A$, $p_B$) of the application agent upstream of the nozzle. The disclosure additionally provides a second pressure sensor for measuring a second pressure reading ($p_D$) of the coating agent downstream of the first pressure sensor, in particular in the nozzle. Furthermore, the disclosure comprises a corresponding application method.

13 Claims, 6 Drawing Sheets

(51) Int. Cl.
*H01M 10/653* (2014.01)
*H01M 50/202* (2021.01)
*H01M 50/293* (2021.01)

(52) U.S. Cl.
CPC ....... *H01M 10/653* (2015.04); *H01M 50/202* (2021.01); *H01M 50/293* (2021.01)

(56) References Cited

U.S. PATENT DOCUMENTS

| | | | |
|---|---|---|---|
| 4,787,332 A | 11/1988 | Geisel | |
| 4,822,647 A | 4/1989 | Nozaki | |
| 4,830,219 A | 5/1989 | Siemann | |
| 4,957,572 A * | 9/1990 | Dewitte | E06B 3/6733 118/302 |
| 5,098,194 A * | 3/1992 | Kuo | B01F 23/29 366/162.3 |
| 5,188,258 A | 2/1993 | Iwashita | |
| 5,263,608 A * | 11/1993 | Kiernan | B05C 11/10 118/710 |
| 5,481,260 A | 1/1996 | Buckler | |
| 5,730,819 A | 3/1998 | Retti | |
| 5,758,680 A * | 6/1998 | Kaveh | G05D 16/2013 438/909 |
| 5,808,559 A | 9/1998 | Buckler | |
| 5,979,704 A | 11/1999 | Holmes | |
| 5,999,106 A | 12/1999 | Buckler | |
| 6,089,469 A | 7/2000 | Fusama | |
| 6,131,770 A | 10/2000 | Allen | |
| 6,579,563 B1 | 6/2003 | Dillon | |
| 6,761,770 B2 | 7/2004 | Bartholomew | |
| 7,101,439 B2 | 9/2006 | Kushihashi | |
| 7,462,377 B2 | 12/2008 | Gaon | |
| 7,745,741 B2 | 6/2010 | Kweon | |
| 7,967,168 B2 | 6/2011 | Geier et al. | |
| 8,156,889 B2 | 4/2012 | Burger | |
| 8,334,023 B2 | 12/2012 | Gaon | |
| 8,586,129 B2 | 11/2013 | Fork | |
| 8,726,836 B2 | 5/2014 | Wang | |
| 9,095,872 B2 | 8/2015 | Topf | |
| 9,163,966 B2 | 10/2015 | Lamkemeyer | |
| 9,539,596 B2 | 1/2017 | Ikushima | |
| 9,579,678 B2 | 2/2017 | des Jardins | |
| 9,718,082 B2 | 8/2017 | deVilliers | |
| 9,962,722 B1 | 5/2018 | Sute | |
| 10,286,354 B2 | 5/2019 | Herm | |
| 10,639,669 B2 | 5/2020 | Woodlief | |
| 10,695,779 B2 | 6/2020 | Saine | |
| 10,807,110 B2 | 10/2020 | Herre | |
| 11,099,480 B2 | 8/2021 | Ookubo | |
| 11,248,414 B2 | 2/2022 | Vianello | |
| 11,648,775 B2 * | 5/2023 | Maeda | B05C 11/1013 347/70 |
| 11,664,249 B2 * | 5/2023 | Kure | H01L 21/67161 427/421.1 |
| 2005/0048195 A1 | 3/2005 | Yanagita | |
| 2005/0048196 A1 | 3/2005 | Yanagita | |
| 2005/0241755 A1 | 11/2005 | Daher | |
| 2007/0029060 A1 | 2/2007 | Murray | |
| 2007/0044713 A1 * | 3/2007 | Yasui | H10N 30/074 427/100 |
| 2007/0207260 A1 | 9/2007 | Collmer et al. | |
| 2008/0210706 A1 | 9/2008 | Geier et al. | |
| 2008/0268147 A1 | 10/2008 | Burger et al. | |
| 2008/0271674 A1 | 11/2008 | Rademacher et al. | |
| 2012/0241088 A1 | 9/2012 | Akiyoshi | |
| 2013/0001326 A1 | 1/2013 | Seiz | |
| 2013/0089656 A1 | 4/2013 | McComiskey | |
| 2013/0089657 A1 | 4/2013 | McComiskey | |
| 2014/0209630 A1 | 7/2014 | O'Leary et al. | |
| 2014/0251525 A1 | 9/2014 | Lininger | |
| 2015/0114990 A1 | 4/2015 | Chen et al. | |
| 2015/0167172 A1 * | 6/2015 | Woelk | C23C 16/45512 118/710 |
| 2016/0361734 A1 | 12/2016 | Routen | |
| 2017/0239840 A1 | 8/2017 | Adams et al. | |
| 2019/0105621 A1 | 4/2019 | Pfeiler et al. | |
| 2021/0129174 A1 | 5/2021 | Hooge | |
| 2022/0032335 A1 | 2/2022 | Li | |
| 2022/0048290 A1 | 2/2022 | Maeda | |
| 2022/0097232 A1 | 3/2022 | Ishizu | |
| 2022/0274076 A1 | 9/2022 | Rosenauer | |
| 2023/0264225 A1 * | 8/2023 | Matsunaga | B05C 5/00 |

FOREIGN PATENT DOCUMENTS

| | | |
|---|---|---|
| CN | 103835931 A | 6/2014 |
| CN | 105377444 A | 3/2016 |
| CN | 205731883 U | 11/2016 |
| CN | 108698065 A | 10/2018 |
| DE | 102005026374 A1 | 12/2006 |
| EP | 1004361 A2 | 5/2000 |
| EP | 1155748 A1 | 11/2001 |
| EP | 1354640 A1 | 10/2003 |
| EP | 2790080 A1 | 10/2014 |
| EP | 3225315 A1 | 10/2017 |
| JP | S6397259 A | 4/1988 |
| JP | 2000306564 A | 11/2000 |
| JP | 2003062493 A | 3/2003 |
| JP | 2003208888 A | 7/2003 |
| JP | 2008272740 A | 11/2008 |
| JP | 2012148244 A | 8/2012 |
| JP | 2013230422 A | 11/2013 |
| JP | 2015223550 A | 12/2015 |
| JP | 2019042675 A | 3/2019 |
| KR | 20100091810 A | 8/2010 |
| WO | 2014127277 A1 | 8/2014 |

OTHER PUBLICATIONS

International Search Report and Written Opinion for PCT/EP2020/059197 mailed Jul. 21, 2020 (13 pages; with English translation).
German Patent and Trademark Office Examination Report for Application No. DE 10 2019 109 208.6 mailed Mar. 6, 2020 (6 pages; with English translation).
German Patent and Trademark Office Opposition for German Patent Application No. DE 10 2019 109 208.6 filed on Aug. 3, 2021 (39 pages; with English machine translation).
Speer, Thomas; "Basic test 2K injection bonding with the DOW matieral Beta force 2815"; P:\Technics IRD7_InnovationsCenter\Test according to numbers SCA Bretten\Year 2012\4700.2012.0056 BMW 2K Injection gluing\Test report\4700.2012.0056 BMW 2K Injection gluing.doc; Jun. 5, 2013 (55 pages; with certified English translation).
EPO Opposition in related matter EP 20718579.4 mailed Dec. 10, 2021 (8 pages; with English machine translation).
PRC National Intellectual Property Administration Notice of Grant for related application No. CN202080027436.3 mailed Apr. 24, 2023 (9 pages; with English translation).
Decision of Grant dated Oct. 22, 2024 in Japanese Patent Application 2021-559855 (with English translation, 5 pages).
Construction Drawings of 87650.400023 (306 pages).
E-Plan of the FFT according to D9 (1 page).
Korean Intellectual Property Office Notice of Preliminary Rejection for related application No. 10-2021-7032391 mailed Feb. 13, 2025 (18 pages; with English translation).

* cited by examiner

APPLICATION DEVICE AND CORRESPONDING APPLICATION METHOD

CROSS-REFERENCE TO RELATED APPLICATIONS

This application is continuation application of, and claims priority to, U.S. patent application Ser. No. 17/601,974, filed on Oct. 7, 2021, which is a national stage of, and claims priority to, Patent Cooperation Treaty Application No. PCT/EP2020/059197, filed on Apr. 1, 2020, which application claims priority to German Application No. 10 2019 109 208.6, filed on Apr. 8, 2019, which applications are hereby incorporated herein by reference in their entireties.

FIELD

The disclosure relates to an application device and a corresponding application method for applying an application agent (e.g. adhesive, heat-conducting paste) into a cavity, in particular in a battery module of an electric battery.

BACKGROUND

In the production of battery modules for electromobility, one process step often involves injecting an adhesive or a heat-conducting paste into the battery module in order to fill cavities in the battery module. Here, it is important to precisely adhere to the filling volume of the injected heat-conducting paste. On the one hand, the filling volume of the heat-conducting paste must be sufficiently large to ensure that the cavity in the battery module is completely filled with the heat-conducting paste. On the other hand, the filling volume of the heat-conducting paste must not be too large, since overfilling the battery module can lead to an excessive pressure increase in the battery module and, in the worst case, to damage to the battery module due to overpressure. To set the correct filling volume of the heat-conducting paste, the volume of the cavity in the battery module has therefore previously been measured first. During the application of the heat-conducting paste, the filling volume is then measured by means of a volumetric flow cell, so that the application of the heat-conducting paste can be terminated when the correct filling volume of the heat-conducting paste has been applied.

However, this known application method has several disadvantages. Firstly, it is always necessary to measure the volume of the cavity in the battery module before application, which is relatively time-consuming. Secondly, during the application, a volumetric cell is required to measure the filling volume.

DETAILED DESCRIPTION

Figure 1A:
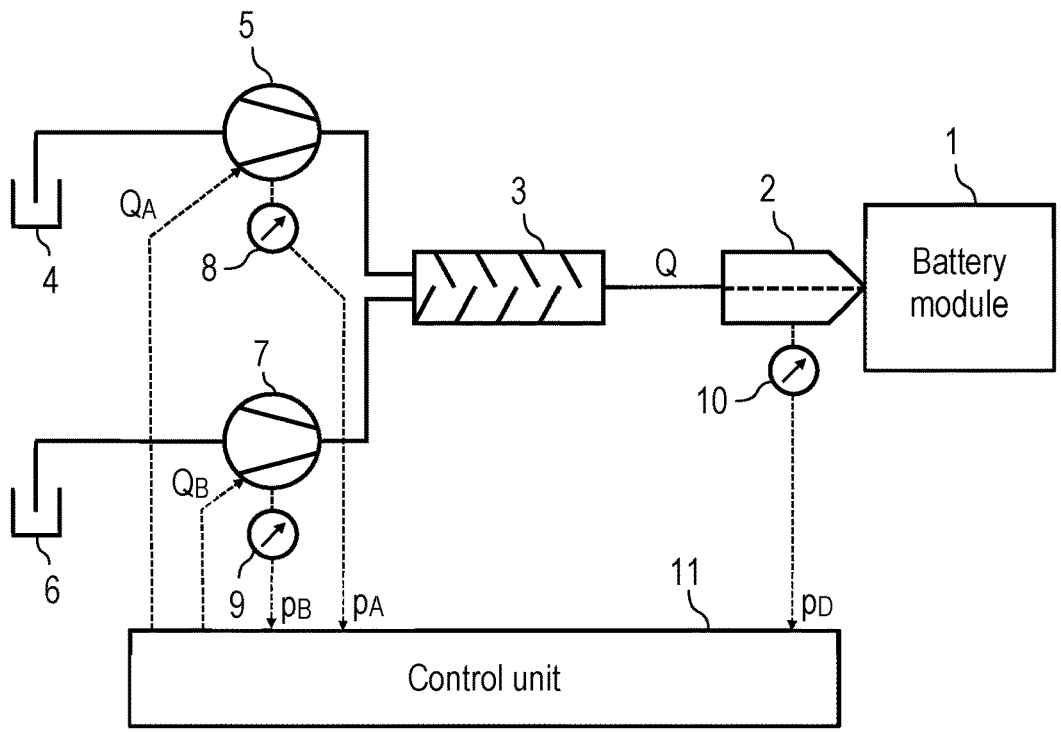
FIG. 1A a first embodiment of an application device according to the disclosure for filling a battery module with a heat-conducting paste, FIG. 1B a flow chart illustrating the application method of the application device according to the disclosure as shown in FIG. 1A, FIG. 2A a modification of FIG. 1A, FIG. 2B a modified flow chart explaining the application method of the application device according to FIG. 2A, FIG. 3 a diagram illustrating the gradual reduction of the flow rate during filling of a battery module, FIG. 4 a schematic representation of a battery module during filling, FIG. 5 a modification of FIGS. 1A and 2A, and FIG. 6 a flow diagram illustrating the detection and localization of a fault in the application device.

The application device according to the disclosure is preferably used for the application of a high-density solid, such as an adhesive or a heat-conducting paste. In principle, however, the application device according to the disclosure is also suitable for the application of other application media, such as insulating materials or sealants, to name just a few examples.

Furthermore, the application device according to the disclosure may be designed to inject the application agent (e.g. adhesive, heat-conducting paste) into a cavity of a battery module of an electric battery, in particular for gap filling in the battery module. However, the application device according to the disclosure can in principle also be adapted to fill cavities in other parts or components. In addition, it is also possible in principle for the application device according to the disclosure to be adapted to coat a component surface with the application agent.

In accordance with the known application devices, the application device according to the disclosure also has a nozzle for dispensing the application agent through the nozzle.

Furthermore, in accordance with most known application devices, the application device according to the disclosure comprises a first pressure sensor to measure a first pressure reading of the application agent upstream of the nozzle.

The application device according to the disclosure is characterized by an additional second pressure sensor to measure a second pressure reading of the coating agent downstream behind the first pressure sensor, preferably in the nozzle.

Within the scope of the disclosure, at least two pressure readings of the coating agent are measured at least two pressure measurement points which are located one behind the other in the direction of flow.

The downstream pressure measuring point is preferably located in the nozzle, so that the second pressure sensor measures the second pressure reading of the coating agent in the nozzle. The upstream pressure measuring point, on the other hand, is located upstream of the nozzle and can be located, for example, in a mixer, a metering device or an upstream pump, to name just a few examples.

However, it is alternatively also possible that the downstream pressure measuring point is located at a mixer, while the upstream pressure measuring point is located at a metering device.

However, the disclosure is not limited to the above examples with respect to the position of the pressure measuring points.

In one example of the disclosure, the application device comprises at least a first metering device for conveying the application agent with an adjustable first delivery flow rate (by volume) to the nozzle. The term of a metering device used in the context of the disclosure implies here, according to the usual technical terminology, preferably that the delivery flow rate of the respective metering device is independent of the pressure conditions at the inlet and at the outlet of the metering device.

Furthermore, the application device according to the disclosure preferably has a control unit. On the input side, the control unit is preferably connected to the two pressure sensors and thus records the two pressure readings measured at the various pressure measuring points. On the output side, on the other hand, the control unit is connected to the metering device and adjusts the flow rate of the at least one metering device as a function of the two pressure readings. Furthermore, an additional first pump (e.g. adhesive pump) can preferably be provided, which delivers the coating agent to the first metering device.

In one example, however, the application agent consists of two components that are mixed together by a mixer. A first metering device meters the first component of the application agent with an adjustable first volumetric flow rate, while a second metering device meters the second component of the application agent with a specific adjustable volumetric second flow rate. On the output side, the two metering devices are connected to the mixer, which mixes the two components of the application agent together. Preferably, the mixer is a static mixer, but other mixer types are also possible in principle. On the output side, the mixer is connected to the nozzle in order to be able to apply the mixed application agent. A pump (e.g. adhesive pump) can be connected upstream of each of the two metering devices in order to convey the application agent or the respective component of the application agent to the associated metering device.

The aforementioned second pressure reading, which is measured at the upstream pressure measurement point, can be measured, for example, in the mixer, in a first inlet of the mixer, in a second inlet of the mixer or immediately downstream of the mixer, to name just a few examples.

Thus, within the scope of the disclosure, it is possible for the downstream pressure reading to be measured in the nozzle while the upstream pressure reading is measured in the upstream mixer.

In contrast, in an example of the disclosure, the upstream pressure reading is measured at the metering device(s). For example, the pressure reading may here be measured in the respective metering device, immediately upstream of the respective metering device, or immediately downstream of the respective metering device. The control unit can then adjust the flow rates of the two metering devices as a function of the three pressure readings.

In an example of the disclosure, the control unit determines a pressure difference between the various pressure readings taken at different pressure measuring points located one behind the other in the direction of flow. The control unit then adjusts the volumetric flow rate of the at least one metering device as a function of this pressure difference.

Thus, the pressure difference between the upstream and downstream pressure readings increases with increasing filling of the cavity. It is therefore useful for the control unit to reduce the flow rate of the at least one metering device as the pressure difference increases, in particular in several steps.

Furthermore, within the scope of the disclosure, overfilling of the cavity should be prevented, since such overfilling can lead to damage to the battery module in extreme cases. Therefore, the control unit preferably continuously compares the pressure difference with a predetermined maximum value that reflects the pressure load capacity of the battery module. The filling of the cavity with the application agent is then terminated by the control unit when the pressure difference exceeds the maximum value, so that overfilling and pressure overload of the battery module are prevented. For example, the control unit can then simply shut down the metering devices or open a bypass line.

In an example of the disclosure, a total of at least five pressure readings are measured in the application device, namely at the two metering devices, in the two inlets of the mixer and in the nozzle. The control unit then adjusts the volumetric flow rates of the two metering devices as a function of the five pressure readings. Here, too, a pressure difference is preferably formed between upstream pressure readings on the one hand and downstream pressure readings on the other hand, with the control unit then setting the delivery flow rates of the metering devices as a function of this pressure difference.

With several pressure sensors located one behind the other in the direction of flow, it is also possible to detect a fault in the application device and localize it within the application device. For example, a bursting of a pipe can be detected and localized if the pressure drops immediately behind the defect location. The control unit can therefore also detect and localize defects in the application device.

Furthermore, it should also be noted that the term "pressure sensor" as used in the context of the disclosure is to be understood in a general sense and also includes sensors or measuring arrangements in which at least one physical quantity other than pressure is measured, the pressure then being derived from the measured physical quantity or quantities.

Figure 1B:
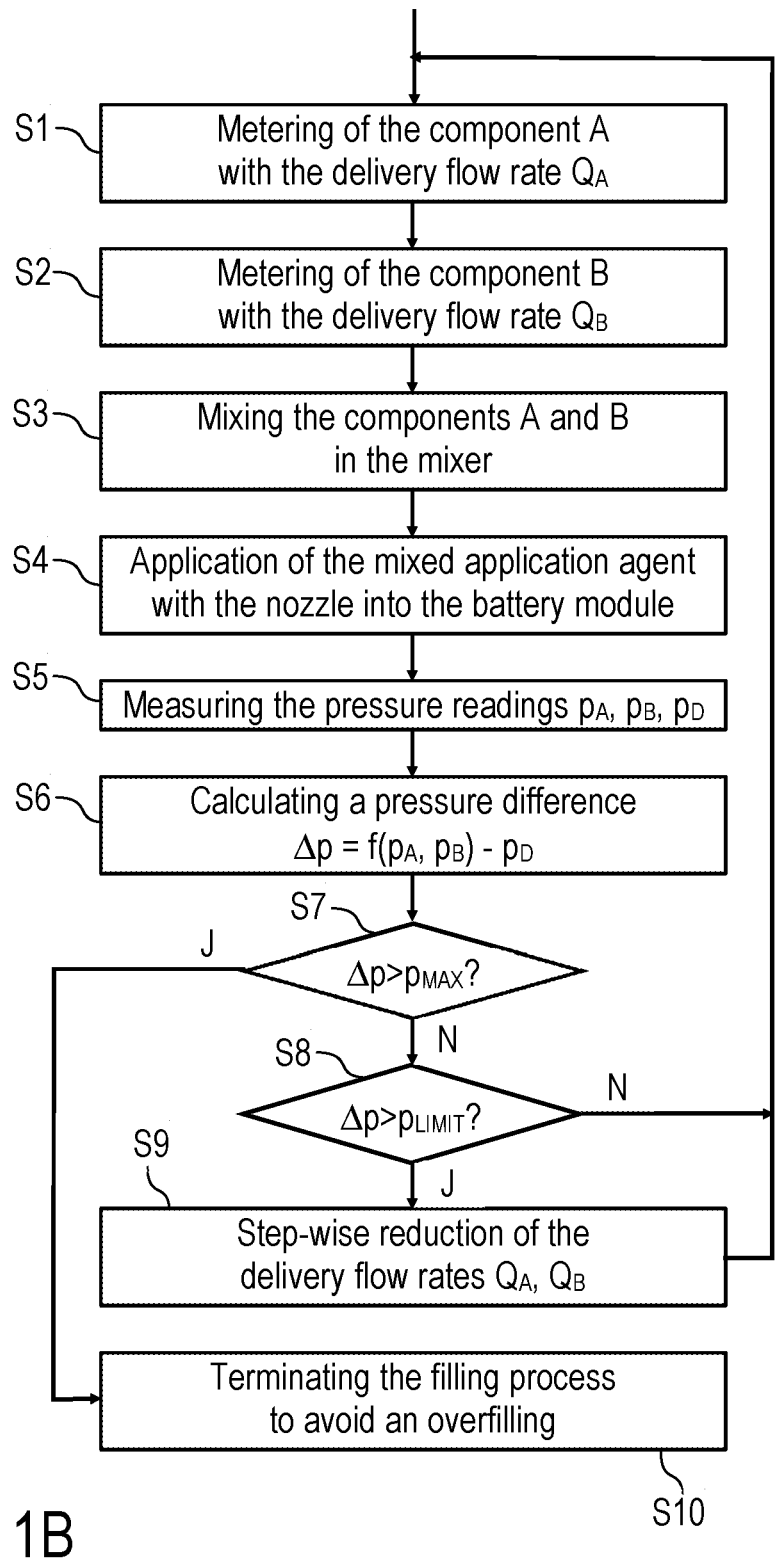

In the following, a first embodiment of the disclosure is described, as shown in FIG. 1A, whereby the flow chart according to FIG. 1B explains an application method.

The application device according to the disclosure is used to fill cavities 16 in a battery module 1 with a heat-conducting paste, the heat-conducting paste being injected into the battery module 1 by a nozzle 2.

The heat-conducting paste to be applied consists of two components A, B, which are mixed by a static mixer 3 (e.g. grid mixer).

Component A of the heat-conducting paste is conveyed by a pump 4, shown only schematically, to a metering device 5, which conveys the component A to the mixer 3 with an adjustable conveying volumetric flow rate $Q_A$.

The other component B of the heat-conducting paste, on the other hand, is conveyed by a pump 6 to a further metering device 7, the metering device 7 conveying the component B to the mixer 3 with an adjustable conveying flow rate $Q_B$.

The application device has two pressure sensors 8, 9, the pressure sensor 8 measuring a pressure reading p A in the metering device 5, while the pressure sensor 9 measures a pressure reading $p_B$ in the other metering device 7.

In addition, the application device has a pressure sensor 10 that measures a pressure reading $p_D$ in the nozzle 2.

The pressure sensors 8, 9, 10 are connected to a control unit 11, which receives the pressure readings $p_A$, $p_B$ and $p_D$ and sets the delivery volumetric flow rates $Q_A$, $Q_B$ of the two metering devices 5, 7 as a function of the pressure readings $p_A$, $p_B$ and $p_D$. Here, the control unit 11 ensures that a certain mixing ratio of the two components A, B is maintained.

In the following, the operating method of the application device according to FIG. 1A is described by means of the flow chart according to FIG. 1B.

In a first step S1, the metering device 5 meters the component A of the heat-conducting paste with a certain flow rate $Q_A$.

In a simultaneously running step S2, the other metering device 7 meters component B of the heat-conducting paste with the adjustable flow rate $Q_B$.

In a simultaneously running step S3, the mixer 3 mixes the two components A and B to form the heat-conducting paste.

In a simultaneous step S4, the heat-conducting paste is injected into the battery module 1 by the nozzle 2.

In step S5, the pressure readings $p_A$, $p_B$ and $p_D$ are measured continuously.

In a simultaneously running step S6, a pressure difference $\Delta p$ is then continuously measured according to the following formula:

$$\Delta p = f(p_A, p_B) - p_D.$$

The pressure difference $\Delta p$ then represents the pressure difference between the downstream pressure measuring point and the upstream pressure measuring point.

It should be mentioned here that the pressure difference $\Delta p$ increases with increasing filling level of the battery module due to the back pressure created. In a step S7 it is therefore continuously checked whether the pressure difference $\Delta p$ exceeds a maximum permissible pressure value $p_{max}$, where the maximum value $p_{max}$ represents the maximum pressure load capacity of the battery module 1.

If such an excessively high pressure increase is detected, the filling process is terminated in a step S10.

Figure 3:
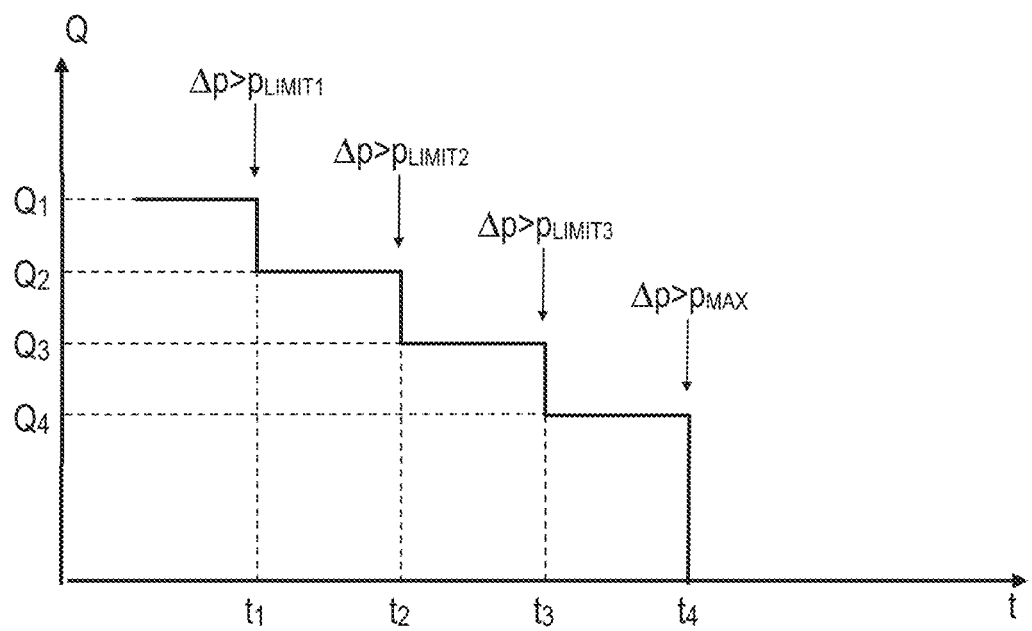

Otherwise, however, in a step S8 it is checked whether the determined pressure difference $\Delta p$ exceeds predetermined limit values $p_{Limit1}$, $p_{Limit2}$, $p_{Limit3}$, as shown in FIG. 3. If these limit values are exceeded, a stepwise reduction of the flow rates $Q_A$, $Q_B$ then takes place in a step S9, as can also be seen in FIG. 3.

Figure 2A:
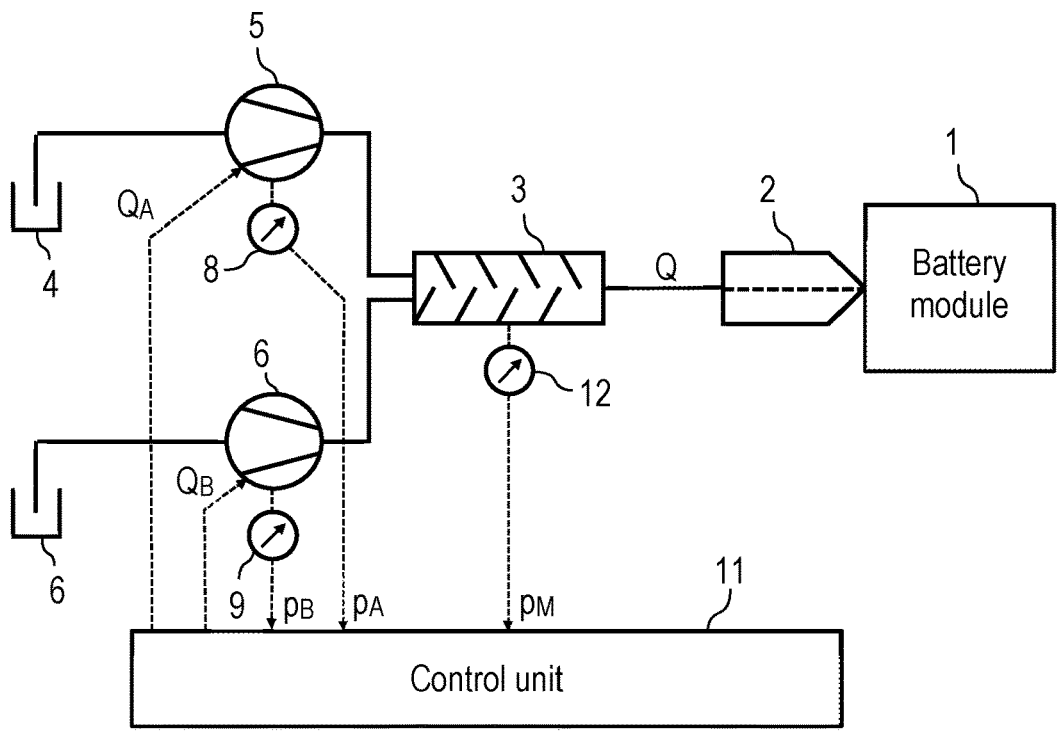
Figure 2B:
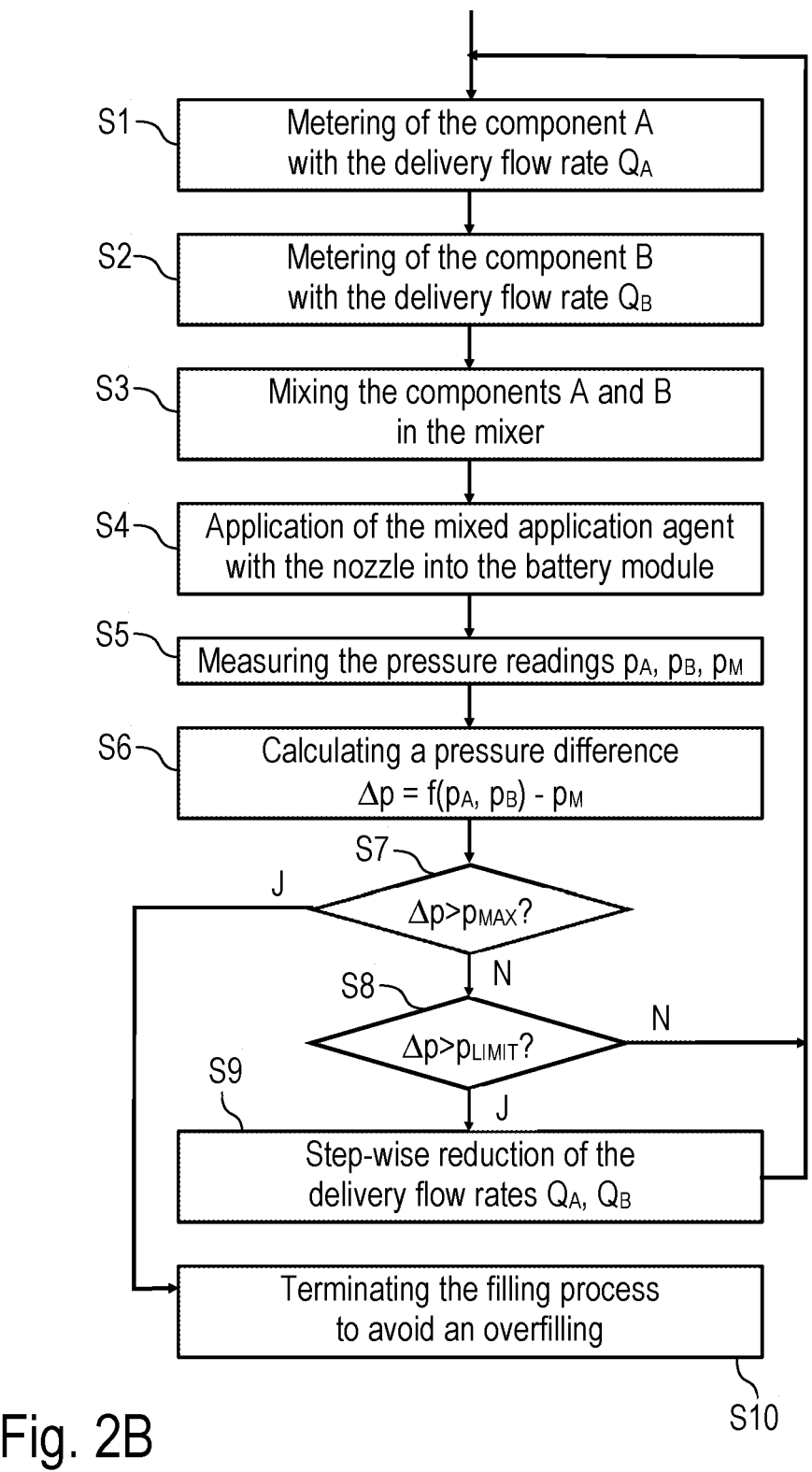

The embodiment according to FIGS. 2A and 2B largely coincides with the embodiment described above and illustrated in FIGS. 1A and 1B, so that to avoid repetition reference is made to the above description, the same reference signs being used for corresponding details.

A special feature of this embodiment is that the pressure sensor 10 for measuring pressure in the nozzle 2 has been replaced by a pressure sensor 12 for measuring pressure in the mixer 3.

Here, too, however, a pressure difference $\Delta p$ is measured between the upstream pressure reading $p_M$ and another pressure reading derived from the upstream pressure readings $p_A$ and $p_B$.

Figure 4:
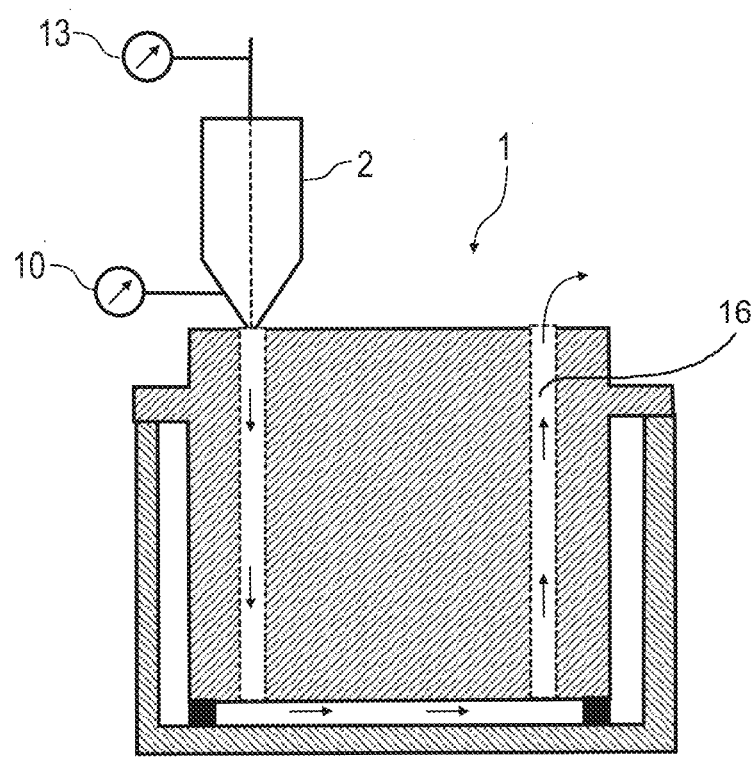

FIG. 4 shows in schematic form the battery module 1 with the nozzle 2 and the pressure sensor 10, which measures the pressure reading pp in the nozzle 2. In addition, another pressure sensor 13 is shown, which measures a pressure reading upstream of the pressure sensor 10 and thus also upstream of the nozzle 2. For example, the pressure sensor 13 can measure the pressure reading in the mixer 3, in the metering device 5, in the metering device 7, or elsewhere within the application device.

Figure 5:
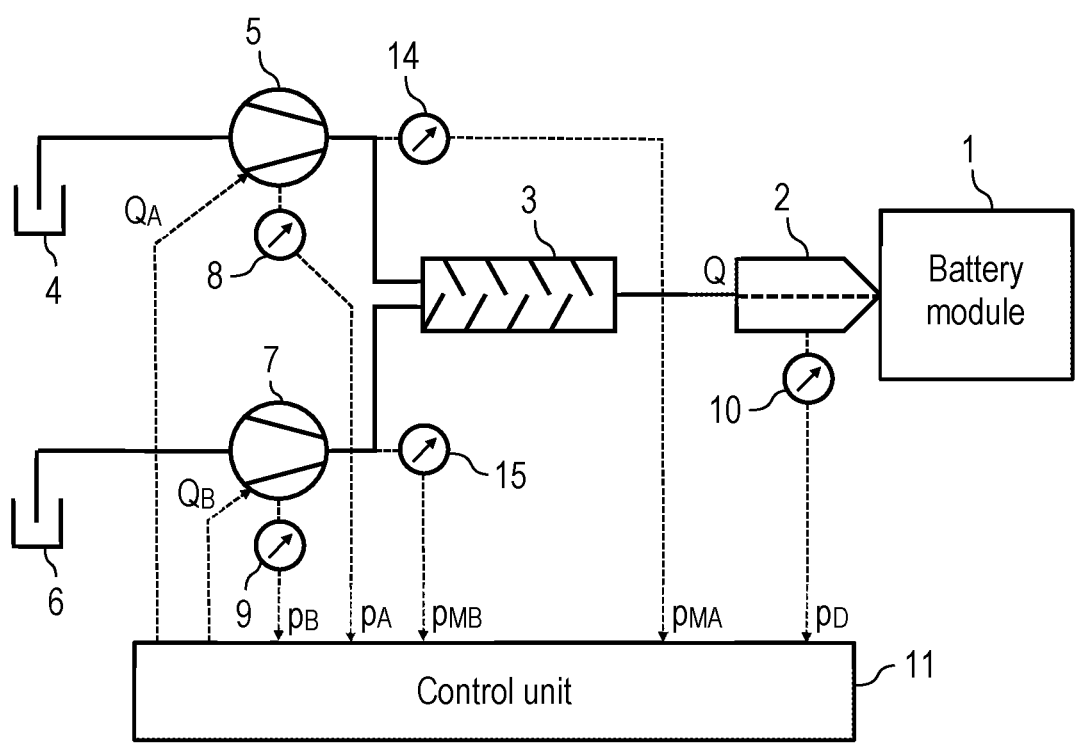

FIG. 5 shows a modification of FIGS. 1A and 2A, so that to avoid repetition, reference is made to the above description, with the same reference signs being used for corresponding individual items.

A special feature compared to the embodiment according to FIG. 1A is that two additional pressure sensors 14, 15 are provided. The pressure sensor 14 measures a pressure reading $p_{MA}$ in the first inlet of the mixer 3, while the pressure sensor 15 measures a pressure reading $p_{MB}$ in the second inlet of the mixer 3. As a result, five pressure readings $p_A$, $p_B$, $p_{MA}$, $p_{MB}$, $p_D$ are measured and evaluated by the control unit 11.

Figure 6:
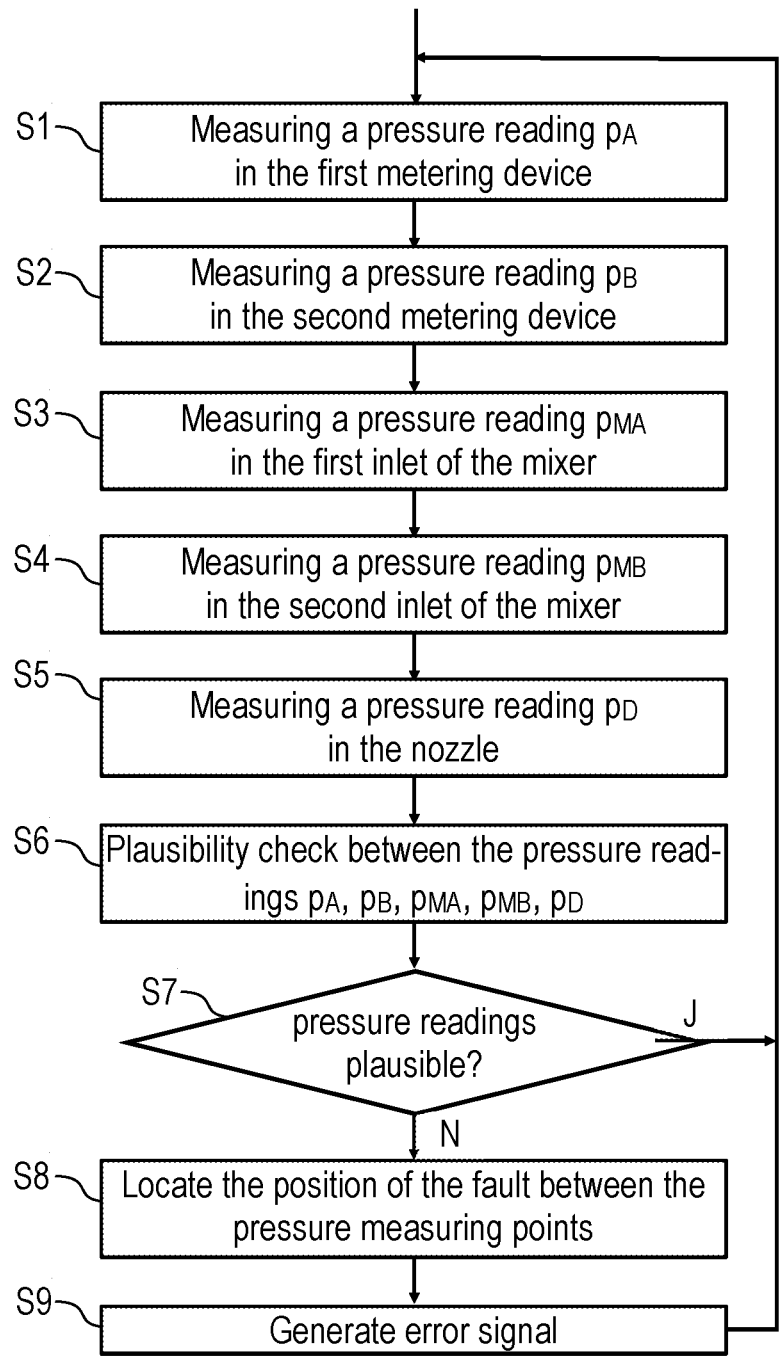

In this way, it is also possible to detect and locate faults in the application device, as described below with reference to the flow chart in FIG. 6.

Thus, in steps S1-S5, the pressure readings $p_A$, $p_B$, $p_{MA}$, $p_{MB}$ and $p_D$ are measured.

In a step S6, a plausibility check is then performed between these pressure readings, which must be in a certain relationship to each other for proper operation.

If the check in a step S7 shows that the pressure readings are plausible with respect to each other, normal operation continues.

Otherwise, on the other hand, in a step S8, the error is localized within the application device, namely in relation to the individual pressure measuring points.

In a step S9, a corresponding error signal can then also be generated.

The disclosure is not limited to the preferred embodiments described above. Rather, a large number of variants and modifications are possible which also make use of the disclosure.

The invention claimed is:

1. Application method for applying an application agent, with the following steps:
   a) application of the application agent through a nozzle into a cavity,
   b) measuring a first pressure reading of the application agent with a first pressure sensor upstream of the nozzle,
   c) measuring a second pressure reading of the application agent with a second pressure sensor downstream of the first pressure sensor,
   d) metering a first component of the application agent with a first delivery flow rate to the nozzle with a first metering device, wherein the first pressure reading is measured at the first metering device,
   e) metering a second component of the application agent with a second delivery flow rate with a second metering device,
   f) measuring a third pressure reading at the second metering device with a third pressure sensor,
   g) mixing the first and second components with a mixer, and
   h) adjusting, with a control unit, the first delivery flow rate of the first metering device and the second delivery flow rate of the second metering device as a function of the three pressure readings.

2. Application method according to claim 1, further comprising
measuring the second pressure reading at the mixer.

3. Application method according to claim 2, wherein the second pressure reading is measured in the mixer.

4. Application method according to claim 2, wherein the second pressure reading is measured in a first inlet of the mixer.

5. Application method according to claim 2, wherein the second pressure reading is measured in a second inlet of the mixer.

6. Application method according to claim 2, wherein the second pressure reading is measured immediately downstream of the mixer.

7. Application method according to claim 1, further comprising the following steps:
   a) determining a pressure difference between the following pressure readings:
      a1) the second pressure reading and
      a2) the first pressure reading, and
   b) setting the first delivery flow rate of the first metering device as a function of the determined pressure difference.

8. Application method according to claim 7, further comprising the following step:

reducing the first delivery flow rate of the first metering device with increasing pressure difference.

9. Application method according to claim 7, further comprising the following step:

comparing the pressure difference with a predetermined maximum value and stopping the application of the application agent through the nozzle into the cavity if the pressure difference exceeds the maximum value in order to prevent overfilling and pressure overload of the cavity.

10. Application method according to claim 1, further comprising the following steps:

measuring a plurality of pressure readings of the application agent at different measurement points within an application device, the measurement points being located one behind another in the direction of flow.

11. Application method according to claim 10, further comprising the following steps:

determination of a fault of the application device by an evaluation of the pressure readings.

12. Application method according to claim 11, further comprising the following step:

determination of a position of the fault relative to the measurement points by the evaluation of the pressure readings.

13. Application method according to claim 10, further comprising the following steps:

a) comparing a downstream pressure reading with an upstream pressure reading and performing a plausibility check between the pressure readings, and b) generating an error signal if the plausibility check shows that the downstream pressure reading does not match the upstream pressure reading.

* * * * *